United States Patent [19]

Barnett et al.

[11] Patent Number: 5,509,051
[45] Date of Patent: Apr. 16, 1996

[54] PRIORITIZATION OF NEIGHBORING CELLS

[75] Inventors: Charles A. Barnett, Sterling, Va.; Ashok D. Mehta, North Potomac; Lou King, Mt. Airy, both of Md.

[73] Assignee: Hughes Aircraft Company, Los Angeles, Calif.

[21] Appl. No.: 118,710

[22] Filed: Sep. 9, 1993

[51] Int. Cl.⁶ ................................................ H04B 1/00
[52] U.S. Cl. ........................... 379/59; 379/58; 379/60; 455/33.2
[58] Field of Search ................. 379/58, 59, 60, 379/63; 455/33.2, 33.1, 54.1, 56.1

[56] References Cited

U.S. PATENT DOCUMENTS

| | | | |
|---|---|---|---|
| 4,435,840 | 3/1984 | Kojima et al. | 455/33.2 |
| 4,613,990 | 9/1986 | Halpern | 455/33.2 |
| 4,670,899 | 6/1987 | Brody et al. | 379/60 |
| 5,241,685 | 8/1993 | Bodin et al. | 455/33.2 |

*Primary Examiner*—Edward L. Coles, Sr.
*Assistant Examiner*—Thomas L. Stoll
*Attorney, Agent, or Firm*—Gordon R. Lindeen, III; Wanda K. Denson-Low

[57] ABSTRACT

Each cell has an assigned classification that determines its inclusion in a measurement list for handing off. The candidate cells, which are selected from the measurement list are given priority level assignments. The priority levels are implemented by the candidate neighboring cells measured RF signal strength; and the order of handing off is arranged in accordance with the adjusted RF signal strength.

13 Claims, 8 Drawing Sheets

PRIORITIZATION OF NEIGHBORING CELLS

BACKGROUND OF THE INVENTION

1. Field of Invention

The present invention relates to cellular communication; and more particularly to a method and system for effecting handoff to one of a plurality of neighboring cells.

2. Description of Related Art

A cellular communication system includes several base transceiver stations, each of which transmits and receives channels of RF information throughout a predetermined coverage area referred to as a cell. The outer boundary of a cell is determined not only by the effective radiated power of the base transceiver, which determines the maximum range at which a mobile unit is able to receive; but also, by the effective radiated power of the mobile telephones, which determines the maximum range at which the base station is able to receive. The base transceiver stations (BTS) determine their corresponding cell's handoff boundaries by setting an RF signal threshold value which must be met or exceeded by a mobile unit entering the cell in order to transfer an on-going call to that cell.

In many cellular installations, each BTS or mobile unit has several scanning receivers that periodically, or on command, measure the RF signal strength of selected traffic channels in order to determine the range of active mobile telephones relative to the transceiver of the cell in which the mobile telephone is located, referred to herein as a serving cell, and the proximity of the telephone to neighboring cells, which overlap the serving cell.

Based upon the received RF signal strength of the mobile unit by the transceiver of the serving cell, the BTS controls the effective radiated output power (ERP) of the mobile unit so that the transmission by the mobile unit does not saturate the base station transceiver when it is close to the center of the cell, but is of sufficient power to enable the BTS to receive the mobile transmission when it is far from the transceiver. When the RF received signal strength of a traffic channel of a neighboring cell measured by the scanning receiver in the serving cell exceeds the set RF signal threshold value that is configured into the system; then the system switches on-going communication to a traffic channel of a neighboring cell, thus, effecting a handoff.

Typically, when the RF signal strength of the traffic channel being used by the mobile unit decreases below a certain level and the RF signal strength of a neighboring cell measured at the mobile unit or the serving cell, increases above a certain level, the system specifies this particular neighboring cell for handoff. Because of the nature of cellular communications each cell has a number of neighboring cells, any one of which could be used to handoff a cellular communication. Thus, under certain conditions, a mobile unit is unable to handoff to the designated neighboring cell, which then requires the designation of another cell for the unit. This of course at times involves the queuing of mobile units awaiting their turn in accessing a particular cell. At certain times, the process of initiating a handoff is time consuming, which results in queuing delays and system congestion. Also, these delays cause the mobile units, under crowded conditions, to be subjected to critical signal strengths before handoff may be effected. In order to overcome these delays, a substantial amount of additional equipment is required which increases the cost of the system.

In light of the foregoing, there is a need for a method and system of handoff in a cellular communication system which overcomes the drawbacks and shortcomings hereinbefore mentioned.

SUMMARY OF THE INVENTION

Accordingly, the present invention is directed to a method and system that substantially obviates one or more of the problems due to limitations and disadvantages of the related art.

To achieve these and other advantages, and in accordance with the purpose of the present invention, as embodied and broadly described, the invention is a method of handing off on-going communications of mobile units in serving cells to a neighboring cell of a cellular communication system. The method comprising assigning to the neighboring cells for each of the serving cells a measurement class; and generating a measurement list of neighboring cells in accordance with the assigned measurement class of the neighboring cells; assigning a priority level to each of the classified cells, selecting a plurality of candidate cells for handoff from the generated measurement list, and, arranging the selected candidate cells in a preferred order for handoff in accordance with the assigned priority level.

In another aspect, a system for handing off an on-going communication of a mobile unit in a serving cell to a selected neighboring cell in a cellular communication system including
a plurality of adjacent cells, each of said adjacent cells constituting one of a plurality of neighboring cells to another adjacent cell, each of said neighboring cells having one of a plurality of measurement classes with respect to the other adjacent cell; means for generating a measurement list of the neighboring cells in accordance with the corresponding measurement class; and means for prioritizing the cells of the generated measurement list.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

DESCRIPTION OF PREFERRED EMBODIMENT

Figure 1:
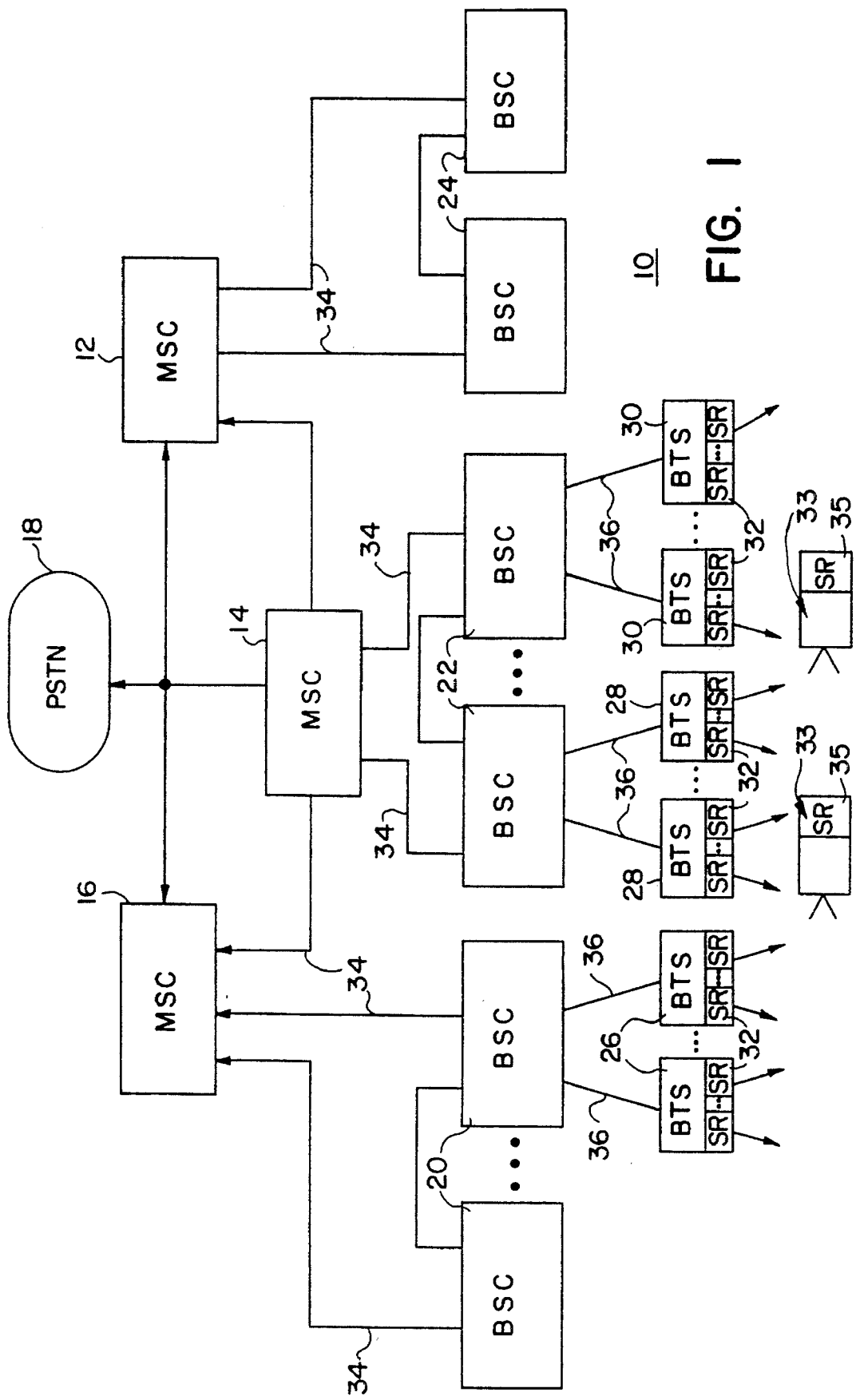
FIG. 1 is a block diagram of a cellular communication system incorporating the principles of the present invention.

A system for effecting handoff of an on-going mobile telephone communication from a serving cell to a neighboring cell is included in and is part of a cellular communication system as exemplified in FIG. 1, which system is generally referred to as 10.

Cellular system 10 has a plurality of mobile switching centers (MSC) 12, 14 and 16 which are connected to each other and to a public switched telephone network (PSTN) 18. Each of the MSC's is connected to a respective group of base station controllers (BSC), each group being referred to as 20, 22 and 24. Each BSC is connected to a group of individual base transceiver stations (BTS) referred to as 26, 28, and 30 respectively. Each BTS defines an individual cell of the communication system.

Each BTS of the groups 26, 28, and 30 includes hardware and software functions required to communicate over the radio channels of the system; and includes transmitters and receivers for communication with the mobile telephone units. Each BTS also includes a plurality of individual scanning receivers (SR) referred to at 32 for scanning selected traffic channels. Each BTS also includes digital multiplex equipment for transmission of audio traffic to its associated BSC.

A plurality of digital mobile units 33 are used with a system for communication over RF traffic channels with the BTS of a particular cell in which it is located. Associated with each digital mobile unit 33 is a scanning receiver 35 for scanning selected channels of the serving and neighboring cells.

Each BSC of group 20, 22, and 24 implements audio compression/decompression and handles call establishment, disconnect, and handoff procedures, and allocates system resources between the individual BTS's associated with a particular BSC. More specifically, each BSC performs handoff execution for transferring on-going communications from one cell to another within the group of BTS's connected to the particular BSC. Each BSC communicates with its associated MSC for effecting a handoff involving a cell or BTS associated with a different BSC.

Each MSC 12, 14, and 16 processes all requests for calls, switching functions, as well as the mobility functions of registration, authentication and handoff. Each MSC includes a home location register (HLR), which is a permanent data base of all subscribers and a visitor location register (VLR), which is a semi-permanent data base for users who are recently active in the area served by the MSC.

Figure 2:
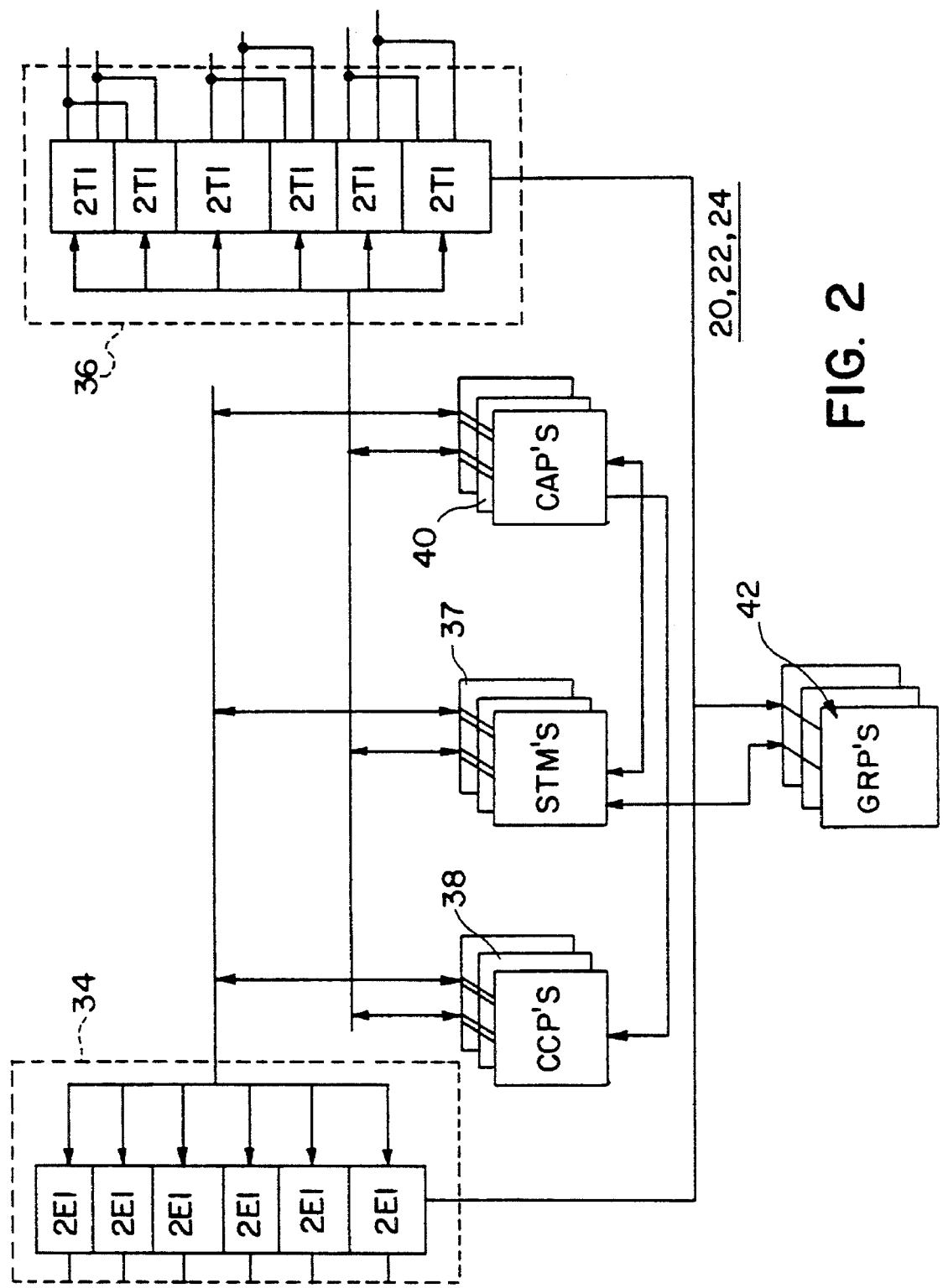
FIG. 2 is a diagram of a base station controller utilized in carrying out the present invention.

Referring to FIG. 2, each BSC 20, 22 and 24 includes trunk interfaces 34 to its associated MSC and trunk interfaces 36 to its associated BTS. Also, each BSC includes a switching and transcoding module (STM) 37. Additionally, each BSC is made up of three types of control processors, which are implemented in identical hardware modules 38, 40, and 42.

Module 38 is a call control processor (CCP). In addition to switching of pulse code modulation (PCM) traffic between trunks 34 and 36 for analog traffic, it terminates call protocol for mobile switching, such as fast analog control channel (FACCH)/slow analog control channel (SACCH) processing and handoff execution. CCP also communicates with MSC for handoff execution. It also performs connection control and mobility management for handoff execution as hereinafter described in detail. For digital configurations there can be more than one CCP for each BSC. When there is more than one CCP per BSC, calls are distributed among CCP's based upon load. The number of CCP's depend upon load and redundancy requirements.

Hardware module 40, which is a channel access processor (CAP), is required for digital configurations as described herein and performs voice channel allocations and deallocations and forwards power and time alignment measurements to the CCP's. Handoff measurement involving mobile assisted handoff is initiated at the CCP module 38 by sending a mobile measurement request message to the channel access processor CAP module 40. The CAP generates the measurement list and sends to the mobile unit a measurement order containing the control or traffic channels of the neighboring cells. The mobile unit then measures the RF signal strength at its scanning receiver and periodically sends a channel quality measurement message to the base station controller.

Hardware module 42 is a global resource processor (GRP) that distributes calls among the CCP's based on load; and communicates with other BSC's for scanning receiver measurements; that is, a GRP communicates with another BSC to exchange messages relating to scanning receiver (SR) measurements and each GRP also communicates with scanning receivers located in a BTS controlled by the BSC in which the particular GRP is located.

Figure 3:
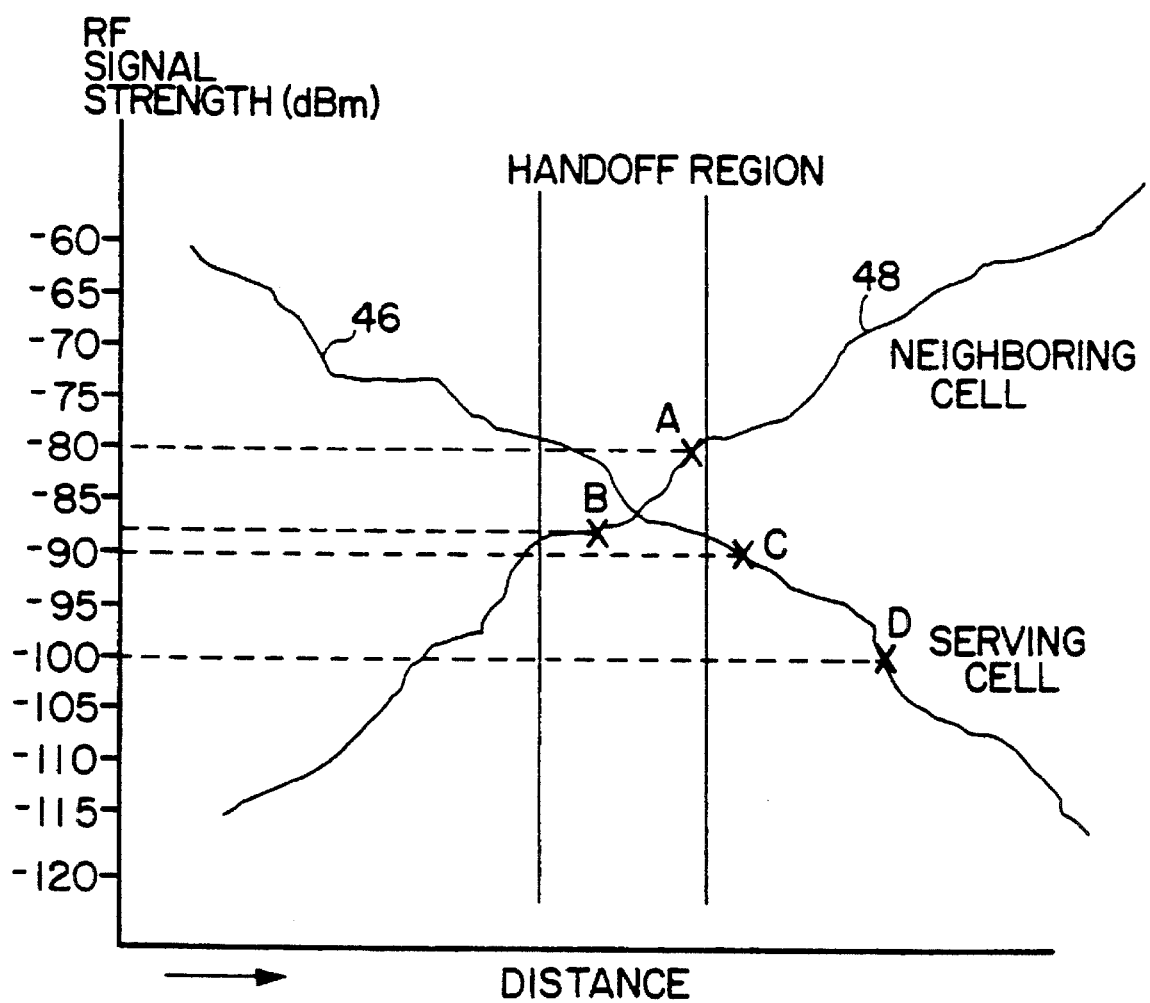
FIG. 3 is a diagram illustrating the relative RF signal strengths of a handoff region.

Referring to FIG. 3, typically the signal strength of a particular cell may range from minus forty dBM at the center of a cell to minus one hundred twenty dBM beyond the boundary of the cell. Assuming that a mobile unit is traveling outwardly from a serving cell in the direction of the arrow, the signal strength of the traffic channel decreases as indicated by line 46. The signal strength of the traffic channel of the neighboring cell reported by the scanning receiver of the mobile, of course, increases at the mobile unit as it travels out of the serving cell as indicated by line 48. In initially determining the RF signal strength for a nominal threshold the RF signal strength measurement is calibrated at both the neighboring cell and the serving cell as the mobile travels in the direction of the arrow. While these measurements are being calibrated, the mobile transmit attenuation level is set by a command from the BSC to the minimum level allowed by the serving cell. After completion of the measurements, a diagram similar to FIG. 3 may be plotted; and a point can be selected at a level where adequate signal quality can be maintained while at the same time minimizing RF interference in the cellular network.

There are two fixed thresholds to be considered when calibrating the system initially. The first is a measurement threshold where handoff measurement is requested. The second is the fixed nominal cell selection threshold at which the mobile unit is transferred from the serving cell to the neighboring cell. The measurement threshold is chosen so that a call does not keep handing off back and forth between cells.

Referring to FIG. 3 assume that the handoff cell selection threshold signal strength is point A of FIG. 3, which is approximately minus eighty dBm, then the RF signal strength of the measurement threshold may be at point B between minus eighty-five and ninety dBm. A critical handoff-threshold may be chosen at point D, for example, and the handoff measurement threshold of the neighboring cell might be chosen to be point C, for example.

Handoff measurement mechanism may be based upon a base station scanning receiver assisted handoff, a mobile assisted handoff, or a mobile assisted handoff with scanning receiver confirmation. At times, a preferred handoff measurement mechanism is not compatible with the assigned call made; and therefore, the preferred mechanism is overridden. For example, a base station scanning receiver assisted handoff is used for an analog communication. Mobile assisted handoff is used for digital, and whenever a particular class of cells is present in a neighboring measurement list, and a base station scanning receiver is the preferred handoff measurement mechanism, a mobile assisted handoff with base station scanning receiver confirmation is used.

There are several different types of mobile telephones, which are classified in accordance with their power output, for example. When a mobile unit establishes a call, its class is recognized, and the BSC is commanded to control the unit at a particular mobile attenuation level, which may or may not be greater than its minimum attenuation level depending on its distance from the BSC or BTS and the power output of the mobile unit. In one preferred embodiment, a mobile unit may be commanded by a BTS or BSC to operate on any one of eight attenuation levels with each increment corresponding to four dB, for example. Thus, when a low or lowest attenuation level is referred to herein, a high or highest power output of the mobile unit is presumed; and when a high or highest attenuation level is referred to herein, the low or lowest power output of the mobile unit is presumed.

Referring again to FIG. 1, and FIG. 3, there are basically two types of scanning receivers, digital and analog. These scanning receivers support three different modes of operation, namely one shot emergency, one shot, and continuous measurement. For one shot emergency mode and one shot mode, a single scan is performed on specified traffic channels for a predetermined duration. For example, a one shot emergency scan occurs when the RF signal strength of a particular mobile unit falls below the critical threshold D (see FIG. 3). A one shot scan occurs at times when the RF signal strength of a mobile unit falls below the measurement threshold. For the continuous mode, scans are performed by the scanning receivers during a defined period following a request from the associated BSC based upon a particular operating condition. The continuous scans are performed repeatedly until the defined duration is exceeded, the reported operating condition is met, or a stop scan request is received from an associated BSC. Thus, the scanning receivers maintain three measurement lists, the one shot emergency, which is the highest priority, the one shot, the next highest, and the continuous measurement list, which is the lowest priority list. This measurement is described in detail in connection with FIG. 7.

In accordance with the invention, each cell has a configured cell measurement class. These classes determine when a neighboring cell should be included in a particular measurement list.

Prior to describing in detail the exemplary embodiment of the system and method for effecting the handoff from a serving cell to a neighboring cell of the present invention, an explanation and detailed description of the meaning of the letter designations used herein is set forth.

The designation RSSI-SRV refers to the RF signal strength of a mobile unit operating in a serving cell and measured by the serving cell. This signal also may be the traffic channel RF signal strength of the mobile unit in the serving cell. The designation RSSI-NBR refers to the RF signal strength of the mobile unit transmit signal as detected by the scanning receiver of the neighboring cell or the mobile unit. RSSI-NBR[1] is the normalized traffic channel strength indicator of the neighboring cell measured at the mobile or neighboring cells scanning receiver. The designation RSSI-TH refers to the nominal cell selection threshold for an individual cell. This nominal threshold is permanently configured into the system. RSSI-THP refers to a dynamic cell selection threshold that is determined in accordance with certain operating criteria of the system. RSSI-C refers to a critical threshold level.

The designation RSSI-MSR refers to the RF signal strength measurement threshold of the traffic channel of a serving cell as distinguished from the neighboring cell selection threshold RSSI-TH or RSSI-THP, as the case may be. The designation RSSI-MSR-T refers to the RF signal strength measurement threshold of a target cell as a neighbor of the serving cell. RSSI-MSR-S refers to the measurement threshold of the serving cell. The designation RSSI-H is a hysteresis value that is added to the RF signal strength of the serving cell when being compared with either RSSI-TH or RSSI-THP to prevent a ping pong effect. A default value of 3 dB is provided for RSSI-H.

The designation MT refers to the current transmit attenuation level of a mobile unit. MM refers to the minimum transmit attenuation level of the mobile unit. MS refers to the minimum transmit attenuation level permitted by the serving cell, and MN refers to the minimum transmit attenuation level permitted by the neighboring cell.

The parameters used in handing off the on-going mobile communications in accordance with the present invention are either listed in the BSC where they relate to a status or a design of the system, or calculated in the BSC based on measurements taken at the mobile unit. The transmitter attenuation level of a mobile unit for a particular channel, which is an attenuation level that has been commanded by the BSC as determined by the forward or reverse traffic channel of the serving cell, is also listed in the associated BSC. The mobile units minimum attenuation level relates to the design of the mobile telephone, and is entered in the BSC when a particular unit either initiates or responds to a call. The minimum mobile transmit attenuation level allowed by a cell is also listed in the associated BSC. A mobile unit shall not transmit at a power level higher than permitted by the minimum permissible attenuation level as determined by the cellular boundaries.

Each BSC of a digital system maintains a list for its appropriate associated BTS's that includes the received signal strength of a traffic channel for a mobile unit in the serving cell and appropriate neighboring cells.

Cellular network classification and prioritization of the present invention are mechanisms designed to facilitate handoff candidate cell selection. The neighboring cell classification determines when handoff measurement is performed in connection with the neighboring cell. Neighboring cell prioritization determines the preferred ordering of the selected classes of handoff candidate cells.

In configuring the cells in a cellular network, neighboring cells are configured for each cell. In accordance with the present invention, these neighboring cells are assigned a measurement class, such as class one to three, for example, and a priority of one to eight, for example. The handoff RF signal strength measurement threshold (RSSI-MSR) for each neighboring cell is also determined prior to configuration of the system and entered along with the cell class and priority.

In accordance with the present invention the neighboring cells are included in a selected measurement list in accordance with operating criteria of the serving cell and the classification of the respective neighboring cell. As herein embodied, class one neighboring cells are included in the handoff measurement list as soon as a traffic channel is activated in the serving cell. Class two neighboring cells are included in the handoff measurement list when RSSI-MSR is greater than the serving cell's traffic channel signal strength RSSI-SRV (forward or reverse). Class three neighboring cells are included in the handoff measurement list when the serving cell's traffic channel signal strength RSSI-SRV falls below the critical RF signal strength threshold (RSSI-C). The neighboring cell priority designation is used after the handoff candidate cell selection process is completed to arrange the cells in a preferred ordering for handoff.

Prior to sorting the handoff candidate cells', one or more signal strength increments (dBm) are added to the normalized neighboring cell's RF signal strength measurement, either mobile assisted handoff or scanning receiver handoff. The number of signal strength increments added to the normalized neighboring cells RSSI-NBR$^1$ is computed by subtracting the neighboring cell priority level from the maximum priority level and multiplying the difference by the dBM assigned to each priority block level.

Figure 8:
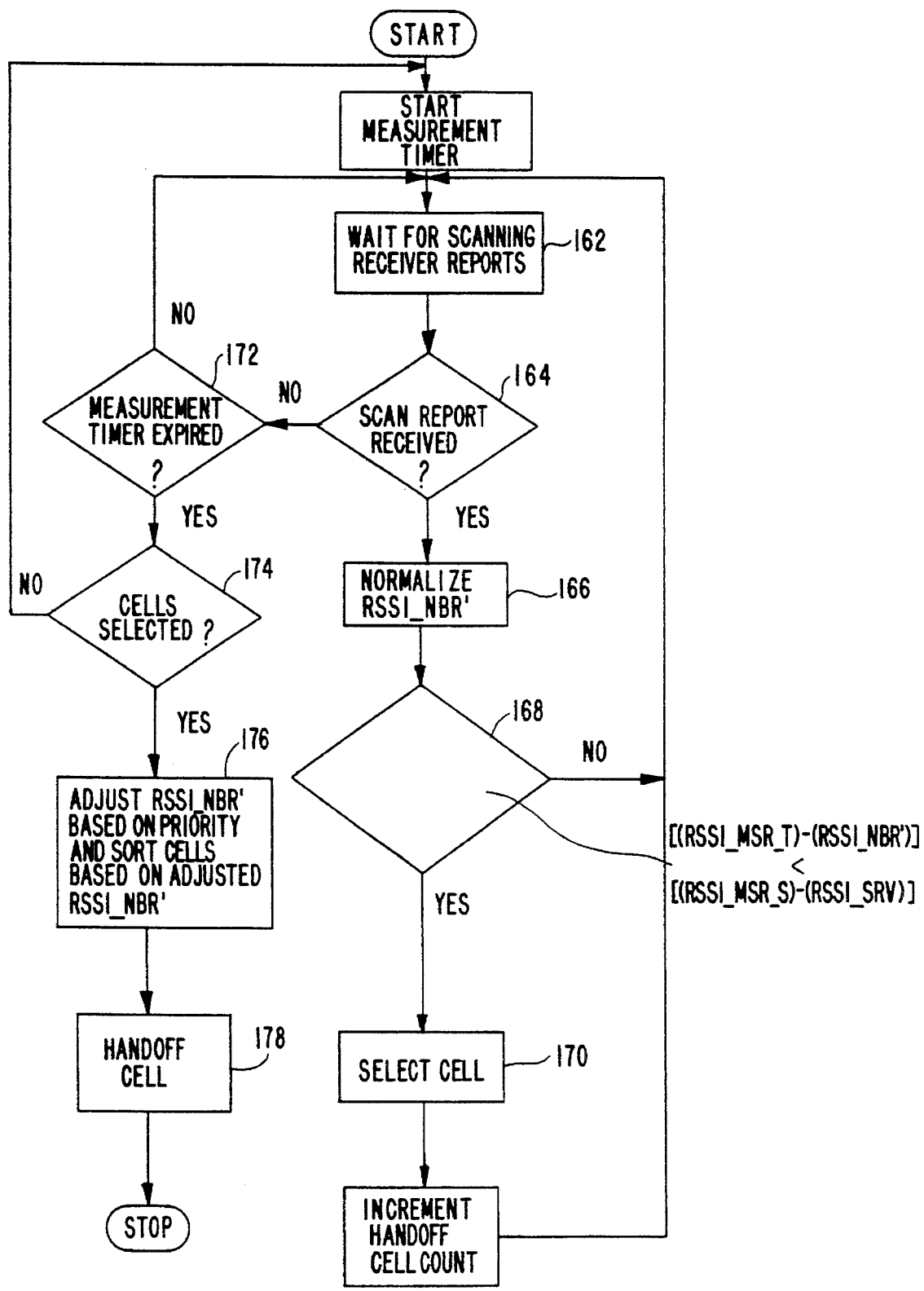
FIG. 8 is a flow chart illustrating final handoff cell selection in accordance with one embodiment of the present invention.

This may be expressed as follows (MP-NP)×4 where MP is the maximum priority such as eight, NP is the neighboring cell priority level, such as five for example; and four is the number of dBM's per priority level. The resultant values are used to sort the cells priority for handoff as shown in FIG. 8. In this example the difference of three is multiplied by four; and twelve increments of dBM are added to the normalized RF signal strength of RSSI-NBR$^1$.

The handoff candidate cells are then sorted in descending order based on the neighboring cells' adjusted RF signal strength. Handoff, to the first cell in the list, is then attempted. If call resources are not available, the next cell in the list is tried until a suitable cell is found for handoff. The handoff candidate cell selection process continues as long as handoff measurement criteria are met or until handoff takes place. The normalized signal strength indicator (dBm) of the neighboring cell RSSI-NBR$^1$ is be computed as follows:

RSSI-NBR$^1$=(RSSI-NBR)+(MT–MN)*4 when MM<=MN

RSSI-NBR$^1$=(RSSI-NBR)+(MT-MM)*4 when MM>MS

Whenever the traffic channel RF signal strength falls below the critical RF signal strength of the serving cell indicated at D of FIG. 3, the measurement reporting and cell selection criteria are changed to RSSI-NBR>RSSI-TH', where RSSI-TH' is the normalized RF critical threshold of the neighboring cell. RSSI-TH' in such event is computed as follows:

RSSI-TH'=RSSI-C-NBR+[MN-MT]*4 for scanning receiver measurement when MM<=MN

RSSI-TH'=RSSI-C-NBR+[MN-MT]*4 for scanning receiver measurement when MM>MN

RSSI-TH'=RSSI-C-NBR+[MM-MN™]*4 for mobile measurement when MM>MN

In the cases where scanning measurements are required, the CCP selects the first cell meeting the handoff criteria and then initiates handoff. In the case where mobile measurements are used for handoff cell selection, all selected cells meeting the selection criteria are included in the handoff candidate cell list.

In describing the operation, reference will be made to FIGS. 4 through 8 as appropriate.

In accordance with the invention, the neighboring cells of each serving cell are assigned a measurement class. As herein embodied and referring to FIG. 4, each of the geometric areas have a boundary A, B, C, D and E, which represents the boundary of an individual cell. When cell E is the serving cell, cell A, for example, may be assigned a measurement class I.

Figure 4:
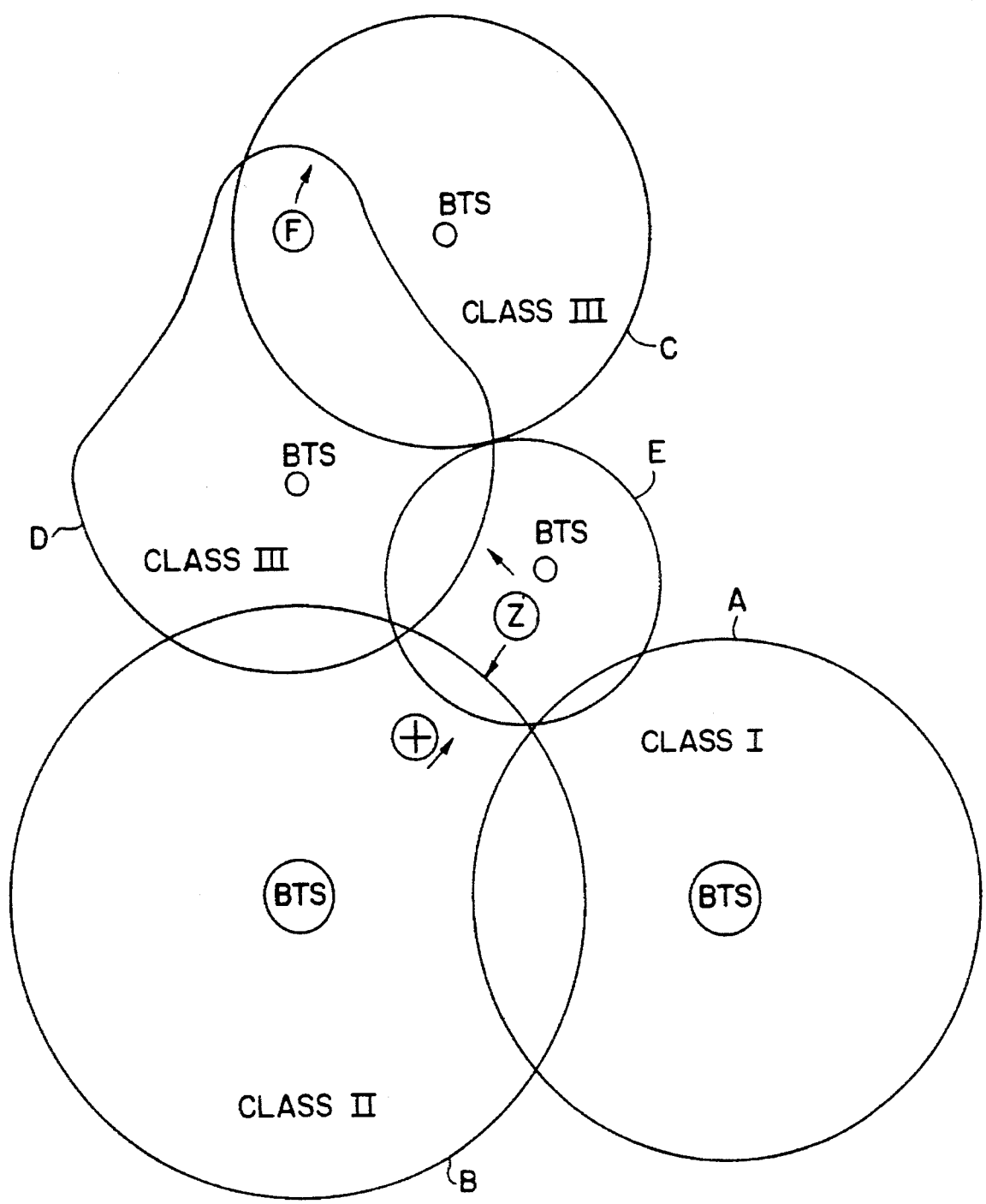
FIG. 4 is a diagram of an arrangement of overlapping cells with classifications and priorities in accordance with the present invention.

Cell B may be assigned a measurement class II, and cells C and D may each be assigned a measurement class III. This is an assignment which is configured in the system. When a cell other than E is the serving cell, the neighboring cells may be assigned a measurement class different than that assigned to the cells as indicated in FIG. 4.

In accordance with the invention, for each serving cell, a priority level is given to the neighboring cells. As herein embodied and referring to FIG. 4, when cell E is the serving cell, cell A may have a priority level I, cell B may have a priority level II, cell C may have a priority level III, and cell D may have a priority level IV. It is contemplated that for such serving cell, a maximum of eight priority levels may be assigned for example.

In accordance with the present invention, a measurement list of neighboring cells is generated in accordance with the assigned measurement class of the cell.

Figure 5:
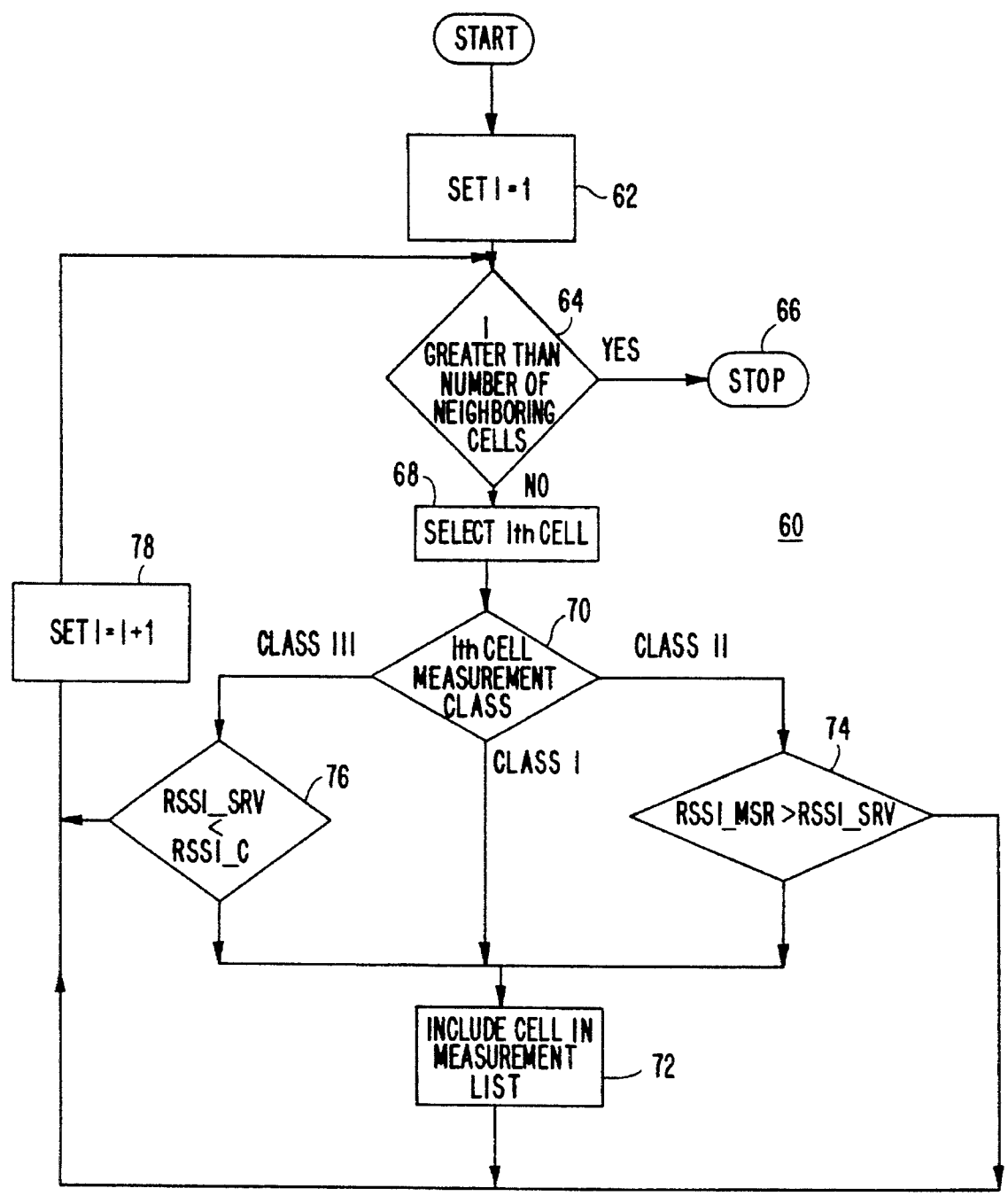
FIG. 5 is a flow chart illustrating list generation for classifying cells in accordance with one embodiment of the invention.
Figure 6:
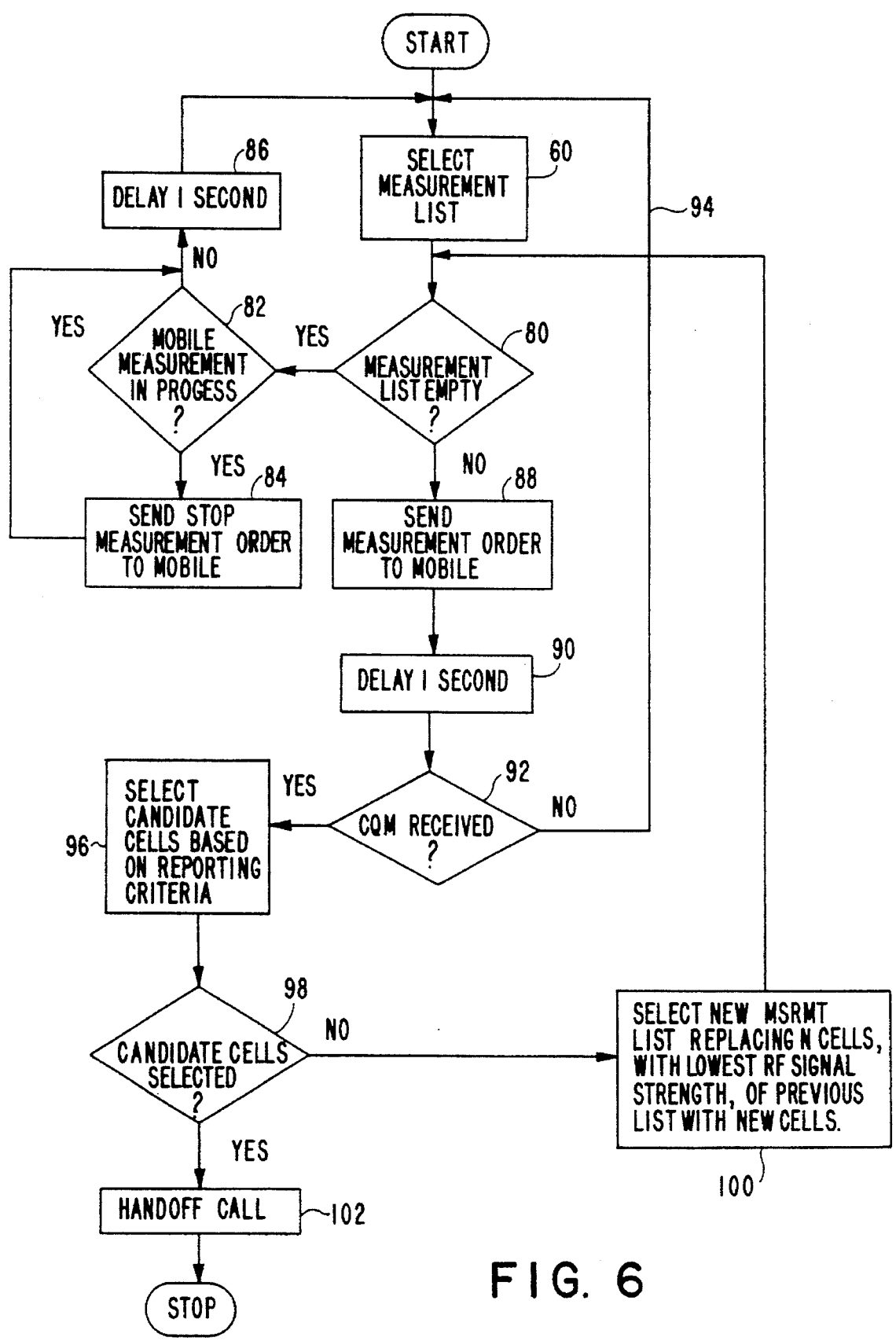
FIG. 6 is a flow chart illustrating measurement processing at the BSC in accordance with one embodiment of the present invention.

As herein embodied and referring to FIG. 5, a counter is set at block 62. In the event, there are no remaining neighboring cells indicated in the scanning receiver, as indicated at block 64, the routine is stopped at block 66. In the event that there are detected neighboring cells, a cell is chosen at block 68, and allocated to one of the measurement classes at block 70. As previously described, class I cells are immediately included in the measurement list as indicated at block 72. Class II cells are included in the measurement list when their handoff measurement threshold RSSI-MSR is greater than a value corresponding to the current traffic channel RF signal strength RSSI-SRV. A cell classified as a class three cell as indicated at block 76 is added to the measurement list when the RF signal strength of the current serving cell RSSI-SRV is less than the critical threshold RSSI-C of the cell. After a cell has been included in the measurement list at 72, or is a class II or III cell which is not included in the measurement list because of not meeting the criteria in block 74 and 76, the counter is incremented at block 78 and the routine is stopped at block 66 when the counter is at a number greater than the total number of neighboring cells as indicated at block 64.

In accordance with the invention, candidate cells are selected from the measurement list, after a channel quality measurement received from the mobile unit. As herein embodied and referring to FIG. 6. The measurement processing at the base station controller BSC is activated as the mobile unit is departing from the serving cell. The system first includes means for selecting the generated measurement list as indicated at block 60. A decision is made at block 80 as to whether or not the one neighboring cell in the selected measurement list, that is, whether or not the list includes any neighboring cells that meet the previous criteria, or are classified as class I cells. In the event there are no neighboring cells yet in the measurement list, the system checks as to whether or not measurement at the mobile unit is in progress at block 82. In the event that measurement is in progress, a stop measurement order is sent to the mobile unit as indicated at block 84, and the routine is delayed one second as indicated at block 86 prior to again commencing the selection of a measurement list at block 60. If there are cells in the measurement list which was compiled in FIG. 5, then a measurement order for a channel quality measurement CQM is sent to the mobile unit at block 88. After a delay of one second as indicated at block 90, a decision is made at block 92 as to whether or not a CQM message has been received from the mobile unit. If no CQM message has been received, the routine begins again as indicated by line 94. If the CQM has been received at the BSC, then the system selects the candidate cells based upon certain reporting criteria as indicated at block 96, which is described in detail in FIG. 7. If no candidate cells are selected at block 98, as a result of block 96, then a new measurement list is selected replacing the cells with the lowest RF signal strength of a previous list with new cells as indicated at block 100 of FIG. 6. In the event that the candidate cells are selected at block 98, as described in more detail in connection with FIG. 7, then a handoff call may be made as indicated at block 102.

Figure 7:
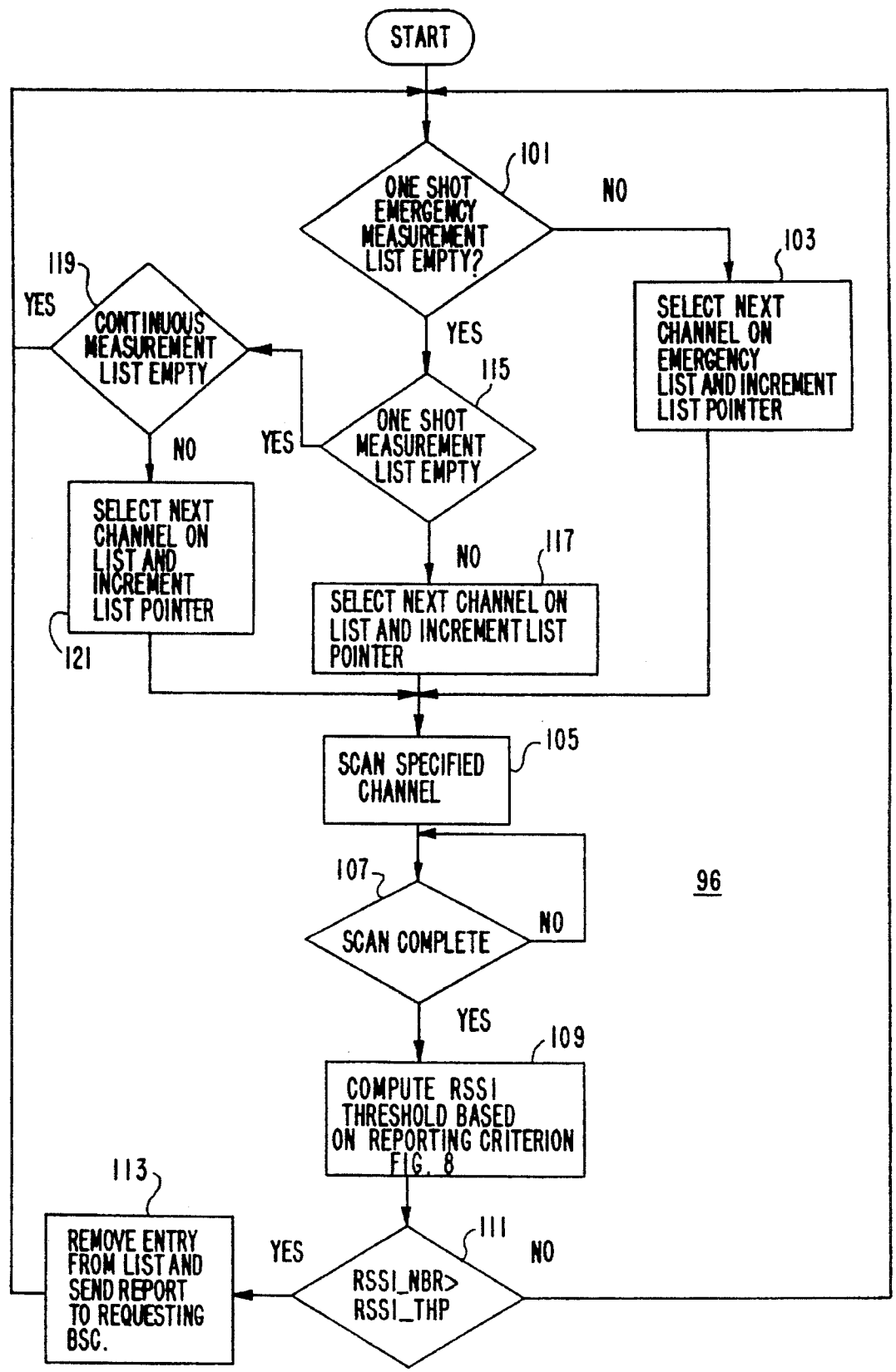
FIG. 7 is a flow chart illustrating the scanning receiver measurement in selecting candidate cells.

Referring to FIG. 7, the measurement by the scanning receivers first checks the conditions that would correspond to the highest priority list at block 101. If there is a handoff to be executed under this highest priority list, the next communication channel on the emergency list is selected at block 103, and the channel is scanned at block 105. Once the scanning is complete as indicated at block 107, the RSSI-TH or the RSSI-THP as the case may be, is computed at 109 based on the reporting criteria. The threshold is then compared with the scanning receivers signal strength of the neighboring cell RSSI-NBR at block 111. If the signal strength RSSI-NBR does not exceed the appropriate cell selection threshold value, then the blocks of the method are repeated for another channel. In the event that the cell selection threshold is exceeded, the cell is removed from the emergency list at block 103 and the report is sent to the associated BSC. This procedure continues for all cell measurements on the emergency list until the list is empty. Then, the reporting conditions for the next priority, the one-shot measurement list, are checked at block 115. If there are measurements to be processed, the next channel on the list is selected at block 117; and the same blocks are carried out as previously discussed in connection with the emergency list. After the processing of the lists at 101 and 115 are completed, the continuous measurement list, which has the lowest priority for handing off, is checked at block 119. Until there are no more measurements from this list to be processed as indicated at block 121, the blocks similar to those described in connection with the measurements of the emergency list at block 101 and the one-shot list at 115 are carried out.

Returning to FIG. 7, if the value RSSI-NBR is greater than the computed threshold RSSI-THP, then the candidate is removed from list at block 113 and reported to the requesting BSC as a candidate cell. Whenever cell preselection takes place, as indicated at block 98 of FIG. 6, a mobile assisted handoff request message containing the preselected cells, a signal strength RSSI-NBR of a neighboring cell, and handoff parameters, is sent to the channel control processor CCP where it is processed as shown in FIG. 8. Upon receiving the mobile assisted handoff cell selection message, the CCP performs final cell selection if scanning receiver confirmation is not required.

In accordance with the invention, the candidate cells are selected for handoff on the basis of the designated priority of the cell. As herein embodied, and referring to FIG. 8, the system waits for the scanning receiver reports at block 162 that were sent at block 113 of FIG. 7. Once the scan report is received at block 164 of FIG. 8, the RF signal strength of the neighboring cell measured at the scanning receiver of the neighboring cell or the mobile unit is normalized at block 166 in order to compensate for the minimum attenuation level of the mobile united permitted by the neighboring cell MN and the current attenuation level of the mobile unit MT, at times when the minimum attenuation level of the mobile unit MM is equal to or less than the minimum attenuation level permitted by the neighboring cell MN. Also, the normalization of the RF signal strength of the neighboring cell measured at the scanning receiver of the neighboring cell or the mobile unit, compensates for the difference between the current attenuation level MT and the minimum attenuation level MM of the mobile unit at times when the minimum attenuation level of the mobile unit MM is greater than the minimum attenuation level permitted by the serving cell MS. The normalized value RSSI-NBR$^1$ is calculated as previously described. This normalized value is then used for selection or rejection of the cell at decision block 168. The cell is selected for handoff at block 170 when

[(RSSI-MSR-T)-(RSSI-NBR$^1$)] is less than
[(RSSI-MSR-S)—<(RSSI-SRV)]

If the measurement timer has expired at block 172 and all candidate cells have been selected at block 174, the RF signal strength value is adjusted by adding one or more signal strength increments dBm to the neighboring cell after being normalized at block 166, as previously described. After the RSSI-NBR$^1$ is adjusted, the cells are sorted into a list in accordance with the RSSSI-NBR$^1$. The cell with the greatest signal strength is at the top or beginning of the list. Since the cells are sorted in descending order in accordance with the adjusted signal strength RSSI-NBR$^1$ as indicated at block 176, the cell at the top or beginning of the list of all the sorted candidate cells is then selected for handoff at block 178.

It will be apparent to those skilled in the art that various modification and variations can be made in the method and system of the present invention without departing from the spirit or scope of the invention. Thus, it is intended that the present invention cover modification and variations of this invention provided they come within the scope of the appended claims and their equivalents.

What is claimed is:

1. A method of prioritizing cells in a cellular communication system including a plurality of serving cells and a plurality of neighboring cells, the method comprising:

assigning to the plurality of neighboring cells for each of a plurality of serving cells a measurement classification designation;

assigning a priority level to each of the classified neighboring Cells, said priority level being assigned without regard to the RF signal strength of the neighboring cells relative to the signal strength of the plurality of serving cells;

generating a measurement list of neighboring cells in accordance with the measurement class of the cells;

selecting candidate cells for handoff from the measurement list;

determining the difference between a maximum priority level and the assigned priority level of each of the neighboring cells;

normalizing the RF signal strength of each selected neighboring cell in accordance with attenuation parameters of the mobile unit; and adjusting the normalized RF signal strength of each normalized cell in accordance with the determined difference multiplied by a number of decibels for each priority level difference.

2. The method of claim 1 wherein the step of assigning the measurement classification designations comprises the substeps of assigning the neighboring cells to one of not less than three different measurement classifications.

3. The method of claim 1 wherein the step of assigning the priority level comprises assigning a priority to one of not less than eight priority levels.

4. The method of claim 1 wherein the step of generating a measurement list comprises including in the measurement list a neighboring cell having an assigned first designated class without regard to an RF signal strength of the serving cell, and including in the measurement list at least one cell of a second designated class at times when a measurement threshold of the designated cell is greater than the RF signal strength of the serving cell.

5. The method of claim 1 wherein the step of generating a measurement list comprises including in the measurement list a cell of one of the plurality of designated measurement classes at times when the cell has a measurement threshold greater than the RF signal strength of the serving cell, and including in the measurement list a cell of another of the plurality of designated classes at times when the RF signal strength of the serving cell is less than the critical threshold of the designated cell.

6. The method of claim 1 wherein the step of generating the measurement list comprises including cells of one of the assigned measurement classes to the list in response to activation of a communication channel in the serving cell.

7. The method of claim 1 wherein the neighboring cells are selected for the measurement list from scanning receivers; and the scanning receiver scans neighboring cells in descending order of importance.

8. A cellular communication system having a serving cell for communicating with a mobile unit and a plurality of neighboring cells capable of communicating with the mobile unit as it leaves the serving cell, the system comprising:

a plurality of individual overlapping cells, each of said plurality of cells constituting one of a plurality of neighboring cells to another cell, each of said plurality of neighboring cells having one of a plurality of measurement classes;

each of said plurality of neighboring cells having an assigned priority level independent of the RF signal strength of the cell;

means for generating a measurement list of the neighboring cells in accordance with the corresponding measurement class;

means for selecting candidate cells for handoff from the generated measurement list;

means for determining the difference between a maximum priority level and the assigned priority level of each of the neighboring cells;

means for normalizing the RF signal strength of each selected neighboring cell in accordance with attenuation parameters of the mobile unit; and means for adjusting the normalized RF signal strength of each cell in accordance with the determined difference multiplied by a number of decibels for each priority level difference.

9. The system of claim 8 wherein the neighboring cells have one of not less than three different measurement classes.

10. The system of claim 8 wherein each of said plurality of neighboring cells has one of not less than eight priority levels.

11. The system of claim 8 wherein the means for generating a measurement list includes means for including cells in the measurement list of the plurality of neighboring cells having a first of the plurality of measurement classes without regard to an RF signal strength of the serving cell, and including means for including in the measurement list one of the plurality of neighboring cells having another of the plurality of measurement classes at times when a measurement threshold of the neighboring cell is greater than the RF signals strength of the serving cell.

12. The system of claim 8 wherein the means for generating a measurement list includes means for including in the measurement list a neighboring cell of one of the plurality of measurement classes at times when the neighboring cell has a measurement threshold greater than the RF signal strength of the serving cell, and including means for including in the measurement list a neighboring cell of another of the plurality of measurement classes at times when the RF signal strength of the serving cell is less than the critical threshold of the neighboring cell.

13. The system of claim 8 wherein the means for generating a measurement list includes means for commencing the generation of the list upon activation of a channel in the serving cell.

* * * * *